United States Patent Office.

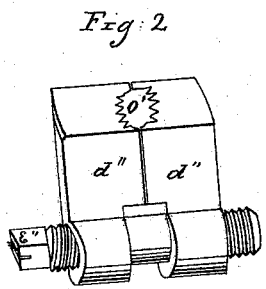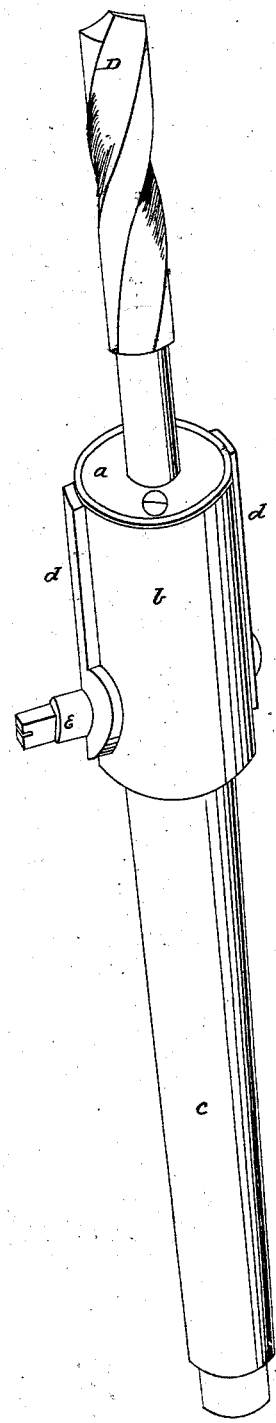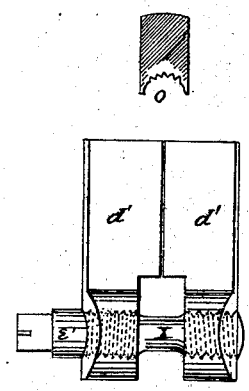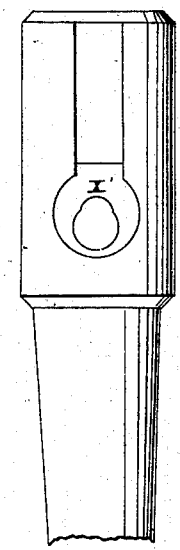

THOMAS K. BACON, OF NORWICH, CONNECTICUT, ASSIGNOR TO HIMSELF, GEORGE A. PRATT, WILLIAM T. NORTON, AND HIRAM B. CROSBY, ALL OF SAME PLACE.

Letters Patent No. 78,251, dated May 26, 1868.

IMPROVED DRILL-HOLDER.

The Schedule referred to in these Letters Patent and making part of the same.

TO ALL WHOM IT MAY CONCERN:

Be it known that I, THOMAS K. BACON, of the city of Norwich, in the county of New London, and State of Connecticut, have invented a new and useful Improvement in Drill-Holders; and I do hereby declare that the following is a full, clear, and exact description thereof, reference being had to the accompanying drawings, making a part of this specification, and to the letters of reference marked thereon, in which—

Figure 1 is a perspective view, showing the drill-holder complete, with the drill inserted, and ready for use.

Figure 2 shows the several parts of the drill-holder.

The nature of my invention consists in the hereinafter-described combination of devices for holding any-sized drills in the drill-holder, which is adapted for use in lathes of any description.

To enable others skilled in mechanical labor to make and use my invention, I will proceed to describe the construction and mode of using and operating the same.

In the drawings, fig. 1, a is a washer, which is screwed or otherwise fastened upon the end of the holder, having a hole in the centre, through which the shank of the drill is inserted. The washer also affords a bearing for the ends of the jaws, thus securing them firmly while holding the drill in its proper place in the exact centre of the holder. The bearing of the washer upon the ends of the jaws also relieves the screw of a portion of the strain to which it is subjected.

b is the socket, through which a deep slot is cut, in which the jaws slide to and from each other in opening and shutting. At the bottom or lower part of the slot, a groove is cut in each side thereof. This groove may be circular or otherwise, and the corresponding parts of the jaws are made to fit therein, so as to slide easily. Also, at the bottom part of this slot, a bar crosses at right angles with the same, through which bar the screw passes. This bar is of the same width with the bearing on the screw, and causes the screw to work steadily in its place, and always to shut the jaws on the centre. This bearing in the bar is a half circle, and rests on the top of the screw.

d represents the two jaws, which open and shut when the screw which passes through their lower end is turned. The two faces of the jaws which hold the drill are cut with parallel grooves, to hold the drill securely in place, and the lower end of each jaw is made with a bulge, which may be oval or of any other shape, to admit of the screw which passes through them being as large as possible. The jaws are so arranged with the screw as to shut on the centre.

e is a screw, with a right and left thread, and is so made that by turning the same in one direction the jaws shall be opened, and in the other direction they are closed. Whether opening or closing, they are always each equally distant from a common centre. One end of the screw is adapted to a wrench or screw-driver.

D represents a drill in the drill-holder, ready for use in a lathe.

Fig. 2 shows the drill-holder taken apart, so as to exhibit it in detail, and x is the centre bearing of the screw, being made so as to fit in the circular bearing in the bar at the bottom of the slot.

x' represents the bar formed in the slot, as before described, and which gives the bearing for the screw, the circular part being that bearing.

o and o' show the face of the jaws, as grooved for the purpose of holding the drill in place.

What I claim as my invention, and desire to secure by Letters Patent, is—

The combination of the jaws d with the washer a, the right and left thread-screw e, and the bar x', the same being constructed and operating conjointly with and in the socket b, in the manner and for the purpose herein set forth.

THOMAS K. BACON.

Witnesses:
B. B. WHITTEMORE,
JOHN E. WARD.